United States Patent [19]

Hempel

[11] Patent Number: 4,801,232
[45] Date of Patent: Jan. 31, 1989

[54] DEVICE FOR THE REMOVABLE FASTENING OF A PLATE-SHAPED COMPONENT ONTO A BASE WITH A T-GROOVE OPEN TOWARDS THE COMPONENT

[75] Inventor: Werner Hempel, Bad Vilbel, Fed. Rep. of Germany

[73] Assignee: CAMLOC GmbH, Fed. Rep. of Germany

[21] Appl. No.: 34,227

[22] Filed: Apr. 2, 1987

[30] Foreign Application Priority Data

Apr. 11, 1986 [DE] Fed. Rep. of Germany ....... 3612199

[51] Int. Cl.$^4$ ............................................. F16B 21/00
[52] U.S. Cl. ..................................... 411/552; 24/453; 24/593; 24/596; 403/348; 403/406.1; 411/553
[58] Field of Search ............... 411/552, 553, 549, 349, 411/84, 85, 182, 913; 24/596, 593, 594, 453; 403/406.1, 408.1, 348

[56] References Cited

U.S. PATENT DOCUMENTS

| | | | |
|---|---|---|---|
| 1,594,776 | 8/1926 | Hagger | 24/594 |
| 1,652,575 | 12/1927 | McGinley | 24/596 |
| 1,671,241 | 5/1928 | Hagger | 411/552 |
| 2,216,385 | 10/1940 | Chobert | 411/552 |
| 2,368,799 | 2/1945 | Barlow | 411/552 |
| 2,424,265 | 7/1947 | Allen | 411/549 |
| 2,884,677 | 5/1959 | Zahodiakin | 411/552 |
| 4,442,571 | 4/1984 | Davis et al. | 411/552 |
| 4,664,252 | 5/1987 | Galbraith | 403/348 X |

FOREIGN PATENT DOCUMENTS

| | | | |
|---|---|---|---|
| 2817251 | 11/1978 | Fed. Rep. of Germany | 411/552 |
| 2239609 | 2/1975 | France | 403/408.1 |
| 538115 | 7/1941 | United Kingdom | 411/552 |

Primary Examiner—Lloyd A. Gall
Attorney, Agent, or Firm—Remy J. VanOphem

[57] ABSTRACT

Device for the removable fastening of a plate-shaped component onto a base with a T-groove open in the direction of the component. The invention consists of a pot-shaped receiving element, a head-bolt, a spring element arranged in the receiving-element and a cross bar arranged at the free end of the shaft of the head-bolt. The cross-bar is insertable in the T-groove and movable against the force of the spring element in the direction of the T-groove floor and engageable behind the shoulders of the T-groove by turning through 90°. In accordance with the invention, the cross-bar has at least one stop interacting with one edge of the aperture of the T-groove in front of the head-bolt shaft end bearing the cross-bar. This stop prevents the continued turning of the head bolt after attainment of the locked position. The pot-shaped receiving element and the cross-bar are fitted with interacting means of guidance in such a way that the cross-bar can be moved axially from its locked position into its unlocked position, under guidance, by a turning movement of 90°.

15 Claims, 1 Drawing Sheet

DEVICE FOR THE REMOVABLE FASTENING OF A PLATE-SHAPED COMPONENT ONTO A BASE WITH A T-GROOVE OPEN TOWARDS THE COMPONENT

BACKGROUND OF THE INVENTION

1. Field of the Invention

The invention is concerned with a device for the removable fastening of a plate-shaped component onto a base with a T-groove open towards the component.

2. Description of the Prior Art

Devices are known in which the conventional cross-bolt consists of a stud, which is attached laterally in the direction of extension of the bolt at its bottom end. This stud has no elements which might prevent an unintentional continued turning of the bolt beyond its locking position. Depending on how far the stud is turned beyond this point, the danger exists that the device will open undesirably and the plate-shaped component drop out of its desired position. In addition to this, for the purpose of operating the device, it has to be known whether the locking device is a so-called quarter turn lock, i.e. the user in question must know in advance that to open the device he must initially turn the conventional cross-bolt in the direction of the groove floor against the power of the spring in order to subsequently open it by means of a rotational movement to be performed through 90°. This can prove to be particularly disadvantageous if the person who closes the device is not the person who opens it. This is the usual case if the device is used for technical appliances which have to be frequently opened and re-closed by various users for repair, maintenance or up-grading purposes subsequent to their final assembly at the manufacturer's.

It is, therefore, the purpose of the invention at hand to create a device which prevents rotational movement beyond the locking position and which allows the user, without knowledge of the type of lock, to open it.

SUMMARY OF THE INVENTION

In accordance with the invention, the aforementioned problem is solved by including a cross-bar connected with a head-bolt, wherein the cross-bar has at least one stop interacting with one edge of the aperture of the T-groove in front of the head-bolt bearing the cross-bar, this stop prevents the continued turning of the head-bolt after attainment of the locked position. A pot-shaped receiving element for the head-bolt and the cross-bar are each fitted with interacting means of guidance in such a way that the cross-bar is movable out of its locked position, by guidance through a turning movement of 90°, into its unlocked position.

The invention consists of a pot-shaped receiving element whose floor has a central drill-hole and, externally, two snap wedges protruding axially on both sides of the drill-hole. The snap wedges are insertable and engageable by means of a diametrically widened drill-hole in the plate-shaped component. A head-bolt, guided by the drill-hole, and having provision for turning the head-bolt, has a spring element insertable in the receiving element and supplies tension between the head-bolt and floor of the receiving element. A cross-bar is provided at the free end of the shaft of the head-bolt. The cross-bar is insertable in the T-groove when the component is placed against the base and is depressed against the force of the spring element in the direction of the floor of the T-groove and subsequently turned to be engageable behind the shoulders of the T-groove by turning through 90°.

The structure according to the invention makes it impossible for an unintended release of the plate-shaped component from the base to occur in two ways. In one way, this is achieved by action of the stop, which ensures that the cross-bar cannot be turned beyond its locked position. In the other way, this is achieved by the cross-bar engaging the shoulders of the T-groove upon reaching the stop point, due to the action of the spring force of the spring element, in combination with the means of guidance of the cross-bolt interacting with the means of guidance of the receiving element. In addition, a simple turning movement, opposite to the direction of movement for closure, suffices to open the device, so that the user does not need to have any knowledge about the method of functioning of the device.

In the preferred embodiment of the invention, the provision for guidance of the cross-bar consists of two diametrically opposed quarter-circle segments bevelled at each end thereof and located at the free end of an extension attached thereto. A similar provision for guidance located on the outside of the floor of the pot-shaped receiving element interacts with the opposed quarter-circle segments. The provision for guidance of the pot-shaped receiving element also consists of two quarter-circle segments bevelled in a similar manner to that described for the cross-bar provision for guidance, and is attached at an angle of 90° to the snap wedges. Thus, the rotational movement for opening the device is securely guided. In addition, the constructional space when the invention is in the unlocked position is utilized optimally, since the provisions for guidance in this position are located next to one another.

DETAILED DESCRIPTION OF THE PREFERRED EMBODIMENT

Figure 1:
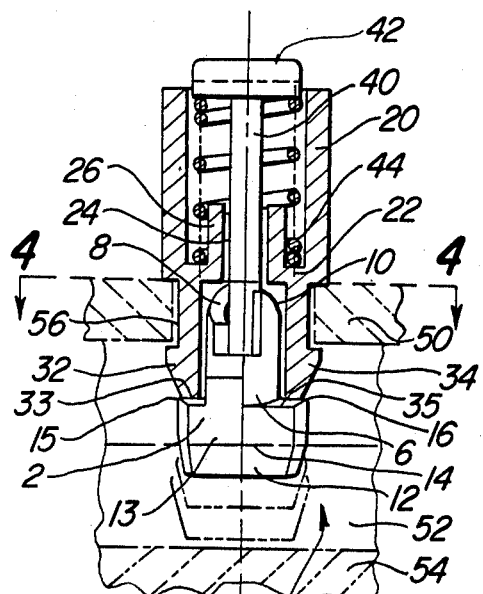
FIG. 1 is a longitudinal cross-section through a fastener device in accordance with the invention.

The invention which is illustrated enlarged in FIG. 1 consists mainly of a cross-bar 1, of a receiving element 20, of a spiral spring 44 and of a head-bolt 40 bearing the cross-bar 1.

Figure 2:
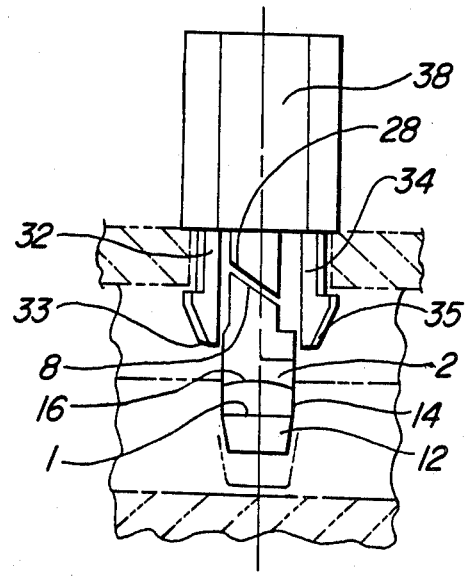
FIG. 2 is a side view of the fastener device in a locked state.
Figure 3:
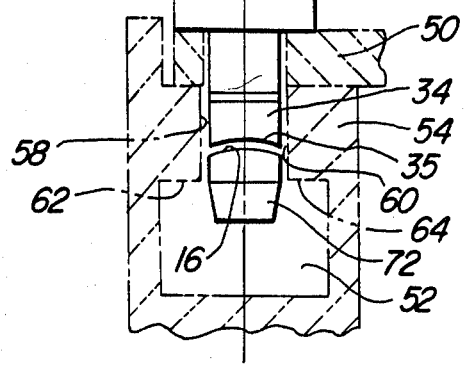
FIG. 3 is a side view of the fastener device in an unlocked state.
Figure 4:
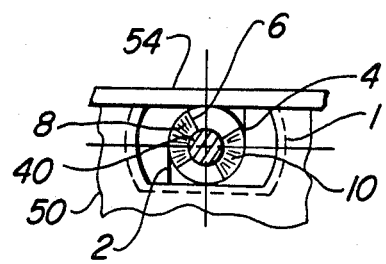
FIG. 4 is a cross-sectional view of the fastener device along line 4—4 in FIG. 1 with portions deleted for clarity.
Figure 5:
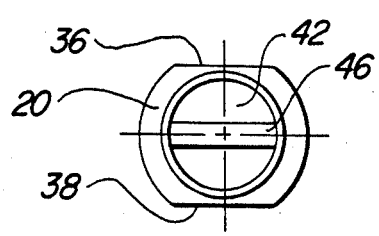
FIG. 5 is a plan view of the fastener device in an unlocked state.
Figure 6:
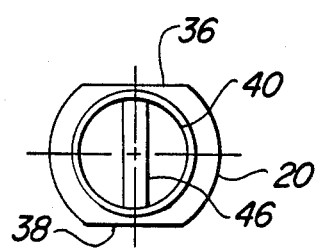
FIG. 6 is a plan view of the fastener device in a locked state.

The receiving element 20, which is standing vertically in FIG. 1, has the shape of a pot which is open at the top, and whose side walls are fitted with two diametrically opposed flat faces 36, 38 shown in FIG. 5. In the floor 22 of the receiving element 20, a central drill-hole 24 is located, which is fitted with a piece of tube 26. Two axially protruding snap wedges 32, 34 which have bow-shaped depressions 33, 35 pointing away from the receiving element 20 at their free end, are located on both sides of the drill-hole 24 on the outside of the floor 22. The snap wedges 32, 34 are so shaped that they are insertable through a diametrically widened drill-hole 56 of a plate-shaped component 50 and are engageable behind it. Thereby a turning of the receiving element 20 relative to the plate-shaped component is prevented. Likewise on the bottom face of the floor 22 of the receiving element 20, two diametrically opposed guidance elements 27, 28 are attached at an angle of 90° to the wedges 32, 34, of which only one, 28, is shown in FIG. 2. These have the shape of two quarter-circle segments bevelled at the end thereof as shown in FIG. 2. These act together with similar guidance elements 8, 10 of the cross-bar so that the cross-bar is guided securely from the locked position into the unlocked position.

The head-bolt 40 passes through the piece of tube 26 of the pot-shaped receiving element 20. The head 42 of the head-bolt 40 is fitted with a slot 46, which makes it possible for a screwdriver to be used for the performance of the turning movement. Additionally, it is recognizable to the user whether the device is locked or open by observation of the location of the slotted head 42 relative to the flat faces 36, 38 of the receiving element 20. Between the head-bolt head 42 and the floor 22 of the receiving element 20 the helical spring 44 is positioned, which tensions the head-bolt 40 and consequently tensions the cross-bar 1, when the cross-bar is rotated to the locked state, as shown in FIG. 2, against the shoulder of a second component 54 equipped with a T-groove 52, thus connecting the plate-shaped component 50 firmly with the second component 54.

At the free end of the shaft of the head-bolt 40, the cross-bar 1 is positioned. The cross-bar 1 has two diametrically opposed radial extensions 13, 14 and a cylindrical, hollow extension 6 for accommodating the end of the shaft of the head bolt. On the side of the cross-bar 1 pointing towards the receiving element 20, each of the radial extensions 13 are rounded off. The radius of these roundings 15, 16 corresponds with the arc radius of the depressions 33, 35 of the snap wedges 32, 34, on which the cross-bar 1 is fixed in its unlocked position in a unique location. In the area of the transition from the radial extensions to the cylindrical extension 6, two stops 2, 4 are located which essentially form a right-angle corner on a portion of the cylindrical surface of the hollow extension 6 at two diametrically opposed sides thereof. The stop prevent a continued turning of the cross-bar 1 beyond the locking position in that they butt onto the aperture edges 58, 60 of the shoulders 62, 64 of the T-groove 52. The two diametrically opposed guidance elements 8, 10 are located at the free end of the hollow extension 6. These guidance elements 8, 10 act together with the guidance elements 27, 28 of the receiving element 20 and have the shape of two quarter-circle segments bevelled off at the end as shown in FIG. 1. In the unlocked state of the device the guidance elements 8, 10 are located next to the guidance elements 27, 28 of the receiving element 20.

In operation, when the present invention is being locked, the guidance elements 8, 10 of the cross-bar 1 are brought towards the guidance elements 27, 28 of the receiving element 20 by a movement against the spring force of the spiral spring 44 in the direction of the floor of the T-groove 52. A subsequent turning movement of the head-bolt 40 through 90° and a springing back subsequent to this, results in the cross-bar being engaged with the shoulders of the T-groove. The opening of the device is performed through a counter turning movement through 90°, whereby the bevelled quarter-circle segments of the cross-bar 1 slide along the guidance elements 27, 28 of the receiving element 20 and thus bring the cross-bar 1 out of its locked position into the unlocked position.

What is claimed is:

1. A device for removably fastening a plate-shaped component onto a base, said plate-shaped component including a diametrically widened hole, said base including a T-groove having diametrically opposed shoulders, each of said shoulders having an edge, said device comprising:

a substantially pot-shaped receiving element, said receiving element having a floor therein, said floor having a central hole therethrough, said receiving element further having a pair of snap wedges protruding axially therefrom on diametrical sides of said hole for being snappingly inserted into said diametrically widened hole in said plate-shaped component, thereby holding said receiving element onto said plate-shaped component;

a head-bolt reciprocally guided in said central hole of said floor of said receiving element, said head-bolt having a first end and a second end, said head-bolt having a head at said first end thereof;

biasing means inserted in said receiving element between said head of said head-bolt and said floor of said receiving element for biasing said head-bolt in a direction axially away from said floor of said receiving element;

a cross-bar located at said second end of said head-bolt, said cross-bar being insertable in said T-groove of said base when said plate-shaped component is placed against said base, said cross-bar further having at least one radial extension thereon, said at least one radial extension of said cross-bar interferingly engaging said shoulders of said T-groove thereby locking said plate-shaped component onto said base when said head-bolt has been depressed against said biasing means and rotated from an unlocked position to a locked position;

stop means for preventing said head-bolt from turning further than said locked position; and means for axial and radial guidance of said cross-bar in response to rotation of said head-bolt, so that said at least one radial extension of said cross-bar is axially lifted off said shoulders of said T-groove when turning said head-bolt from the locked position to the unlocked position.

2. The device of claim 1, wherein said means for guidance comprises:

a first pair of diametrically opposed quarter circle segments attached axially to said cross-bar, said first pair of segments having a first bevelled end;

a second pair of diametrically opposed quarter circle segments attached axially to the receiving element at an angle of 90° relative to said pair of snap wedges, said second pair of quarter circle segments having a second bevelled end, said first bevelled end and said second bevelled end being in mutual contact so that as said head-bolt is rotated from said locked position to said unlocked position said cross-bar is caused to likewise rotate and simultaneously axially move relative to said T-shaped groove, wherein said at least one radial extension of said cross-bar is axially lifted off said shoulders of said T-groove thereby unlocking said plate-shaped component from said base when said head-bolt has been rotated to said unlocked position.

3. The device of claim 2, wherein said stop means for preventing said head-bolt from turning further than said locked position comprises:
   at least one stop surface on said cross-bar which interferingly contacts an edge of at least one of said shoulders of said T-groove adjacent said cross-bar when said head-bolt is rotated to said locked position.

4. The device of claim 3, wherein said cross-bar, further has a cylindrical, hollow extension into which said second end of said head-bolt is inserted.

5. The device of claim 4, wherein said snap wedges have bow shaped depressions pointing away from said pot-shaped receiving element; said hammer shaped head is rounded to complement said bow shaped depressions.

6. A device for removably fastening a plate-shaped component onto a base, said plate-shaped component including a diametrically widened hole, said base including a T-groove having diametrically opposed shoulders, each of said shoulders having an edge, said device comprising:
   a substantially pot-shaped receiving element, said receiving element having a floor therein, said floor having a central hole therethrough, said receiving element further having a pair of snap wedges protruding axially therefrom on diametrical sides of said hole for being snappingly inserted into said diametrically widened hole in said plate-shaped component, thereby holding said receiving element onto said plate-shaped component;
   a head-bolt reciprocally guided in said central hole of said floor of said receiving element, said head-bolt having a first end and a second end, said head-bolt having a head at said first end thereof;
   biasing means inserted in said receiving element between said head of said head-bolt and said floor of said receiving element for biasing said head-bolt in a direction axially away from said floor of said receiving element;
   a cross-bar located at said second end of said head-bolt, said cross-bar being insertable in said T-groove of said base when said plate-shaped component is placed against said base, said cross-bar further having attached at one end thereof away from said head-bolt two radial extensions;
   means for axial and radial guidance of said cross-bar in response to rotation of said head-bolt, comprising:
      a first pair of diametrically opposed quarter circle segments attached axially to said cross-bar, said first pair of quarter circle segments having a first bevelled end;
      a second pair of diametrically opposed quarter circle segments attached axially to said receiving element at an angle of 90° to said pair of snap wedges, said second pair of quarter circle segments having a second bevelled end, said first bevelled end and said second bevelled end being in mutual contact so that as said head-bolt is rotated from a locked position to an unlocked position said cross-bar is caused to likewise rotate and simultaneously axially move relative to said T-shaped groove, wherein said two radial extensions of said cross-bar are axially lifted off said shoulders of said T-groove thereby unlocking said plate-shaped component from said base when said head-bolt has been rotated from the locked to the unlocked position; and
   stop means for preventing said head-bolt from turning further than said locked position, said stop means comprising:
      at least one stop surface on said cross-bar which interferingly contacts said edge of at least one of said shoulders of said T-groove adjacent said cross-bar when said head-bolt is rotated to said locked position.

7. The device of claim 6, wherein said at least one stop surface comprises two stop surfaces, each of said two stop surfaces being located on said cross-bar substantially adjacent said two radial extensions of said cross-bar, said two stop surfaces further forming a substantially right angle on a portion of said radial extensions.

8. The device of claim 7, wherein said receiving element has an outer shell surface, said outer shell surface having two diametrically opposed flat faces; said head of said head-bolt has a slot for aiding rotation of said head-bolt, the relative orientation of said slot relative to said diametrically opposed flat surfaces giving an indication of whether said cross-bar is interferingly engaged with said shoulders of said T-groove.

9. The device of claim 8, wherein said snap wedges have bow-shaped depressions pointing away from said receiving element; each of said radial extensions have a rounded portion which complements said bow-shaped depressions.

10. The device according to claim 9, wherein said rotation from said locked position to said unlocked position is 90°.

11. A fastening system comprising:
   a plate-shaped component having a diametrically widened hole;
   a base having a T-groove, said T-groove having diametrically opposed shoulders, each of said shoulders having an edge;
   a substantially pot-shaped receiving element, said receiving element having a floor therein, said floor having a central hole therethrough, said receiving element further having a pair of snap wedges protruding axially therefrom on diametrical sides of said central hole for being snappingly inserted into said diametrically widened hole in said plate-shaped component, thereby holding said receiving element onto said plate-shaped component;
   a head-bolt reciprocally guided in said central hole of said floor of said receiving element, said head-bolt having a first end and a second end, said head-bolt having a head at said first end thereof;
   biasing means inserted in said receiving element between said head of said head-bolt and said floor of said receiving element for biasing said head-bolt in a direction axially away from said floor of said receiving element;
   a cross-bar located at said second end of said head-bolt, said cross-bar being insertable in said T-groove of said base when said plate-shaped component is placed against said base, said cross-bar further having at least one radial extension thereon, said at least one radial extension of said cross-bar interferingly engaging said shoulders of said T-groove thereby locking said plate-shaped component onto said base when said head-bolt has been depressed against said biasing means and rotated from an unlocked position to a locked position;

stop means for preventing said head-bolt from turning further than said locked position; and means for axial and radial guidance of said cross-bar in response to rotation of said head-bolt, so that said at least one radial extension of said cross-bar is axially lifted off said shoulders of said T-groove when turning said head-bolt from the locked position to the unlocked position.

12. The fastening system of claim 11, wherein said means for axial and radial guidance comprises:

a first pair of diametrically opposed quarter circle segments attached axially to said cross-bar, said first pair of segments having a first bevelled end; and a second pair of diametrically opposed quarter circle segments attached axially to said receiving element at an angle of 90° relative to said pair of snap wedges, said second pair of quarter circle segments having a second bevelled end, said first bevelled end and said second bevelled end being in mutual contact so that as said head-bolt is rotated from said locked position to said unlocked position said cross-bar is caused to likewise rotate and simultaneously axially move relative to said T-shaped T-groove, wherein said at least one radial extension of said cross-bar is axially lifted off said shoulders of said T-groove thereby unlocking said plate-shaped component from said base when said head-bolt has been rotated to said unlocked position.

13. The fastening system of claim 12, wherein said stop means comprises:

at least one stop surface on said cross-bar which interferingly contacts said edge of at least one of said shoulders of said T-groove adjacent said cross-bar when said head-bolt is rotated to said locked position.

14. The fastening system of claim 13, wherein said cross-bar has two radial extensions, said cross-bar further having a cylindrical, hollow extension into which the second end of said head-bolt is inserted.

15. The fastening system of claim 14, wherein said snap wedges have bow-shaped depressions pointing away from said pot-shaped receiving element; and said radial extensions are rounded to complement said bow-shaped depressions.

* * * * *

UNITED STATES PATENT AND TRADEMARK OFFICE
CERTIFICATE OF CORRECTION

PATENT NO. : 4,801,232

DATED : January 31, 1989

INVENTOR(S) : Werner Hempel

It is certified that error appears in the above-identified patent and that said Letters Patent is hereby corrected as shown below:

Column 3, line 46, delete "stop" and insert ---- stops ----.

In the Claims

Column 4, line 63, delete "shaped".

Column 5, line 13, between "bow" and "shaped" insert a hyphen ---- - ----.

Column 5, line 15, between "bow" and "shaped" insert a hyphen ---- - ----.

Column 5, line 65, delete "shaped".

UNITED STATES PATENT AND TRADEMARK OFFICE
CERTIFICATE OF CORRECTION

PATENT NO. : 4,801,232

DATED : January 31, 1989

INVENTOR(S) : Werner Hempel

It is certified that error appears in the above-identified patent and that said Letters Patent is hereby corrected as shown below:

<u>In the Abstract</u>

Line 5, after "cross" insert a hyphen ---- - ----.

Line 15, between "head" and "bolt" insert a hyphen ---- - ----.

Signed and Sealed this

Seventeenth Day of October, 1989

Attest:

DONALD J. QUIGG

*Attesting Officer*  *Commissioner of Patents and Trademarks*